(12) United States Patent
Beraud et al.

(10) Patent No.: US 9,475,254 B2
(45) Date of Patent: Oct. 25, 2016

(54) MULTIAXIAL STACK RIGIDLY CONNECTED BY MEANS OF WELD POINTS APPLIED BY MEANS OF INSERTED THERMOPLASTIC WEBS

(75) Inventors: Jean-Marc Beraud, Rives (FR); Jean-Benoit Thiel, La Chapelle de la Tour (FR)

(73) Assignee: Hexcel Reinforcements, Dagneux (FR)

( * ) Notice: Subject to any disclaimer, the term of this patent is extended or adjusted under 35 U.S.C. 154(b) by 120 days.

(21) Appl. No.: 13/503,032

(22) PCT Filed: Oct. 21, 2010

(86) PCT No.: PCT/FR2010/052248
§ 371 (c)(1),
(2), (4) Date: Apr. 20, 2012

(87) PCT Pub. No.: WO2011/048340
PCT Pub. Date: Apr. 28, 2011

(65) Prior Publication Data
US 2012/0202004 A1    Aug. 9, 2012

(30) Foreign Application Priority Data
Oct. 23, 2009   (FR) .................................. 09 57452

(51) Int. Cl.
*B32B 5/08* (2006.01)
*B32B 5/12* (2006.01)
*B32B 5/22* (2006.01)
*B32B 5/24* (2006.01)
(Continued)

(52) U.S. Cl.
CPC ............... *B32B 5/022* (2013.01); *B29B 11/16* (2013.01); *B29C 70/10* (2013.01); *B29C 70/22* (2013.01);
(Continued)

(58) Field of Classification Search
CPC ....... B32B 5/22; B32B 5/26; B32B 2250/20; B32B 2260/023; B32B 15/02; B32B 21/02; B32B 2255/02; B32B 2260/021; B32B 7/045; B32B 5/022; B32B 3/266; B32B 27/12; B32B 37/0084; B32B 5/12; B32B 2262/106; B32B 5/04; B32B 5/10; B32B 5/24; B32B 7/12; B32B 7/14; Y10T 428/248; Y10T 428/2482; Y10T 428/24124
USPC ....... 428/113, 114, 195.1, 198, 292.1, 293.7, 428/294.1, 297.4, 297.7, 298.1, 298.7, 428/299.1, 299.4, 300.1, 300.7, 296, 131, 428/132, 133, 137, 138, 301.4, 299.7; 156/73.2, 73.4, 580.2; 442/366, 409, 442/410, 411
See application file for complete search history.

(56) References Cited

U.S. PATENT DOCUMENTS 4,484,459 A    11/1984   Hutson
4,677,831 A    7/1987    Wunner
(Continued)

FOREIGN PATENT DOCUMENTS

EP    1175998    1/2002
EP    1473132    11/2004
(Continued)

*Primary Examiner* — Joanna Pleszczynska
(74) *Attorney, Agent, or Firm* — W. Mark Bielawski; David J. Oldenkamp

(57) ABSTRACT

The present invention relates to a stack of fibrous materials including at least two unidirectional carbon fiber layers, each extending in different directions, wherein each one of the unidirectional layers is connected by means of at least one of the surfaces thereof to an adjacent web of thermoplastic fibers, at least one web being inserted between two consecutive unidirectional layers, characterized in that the link between each unidirectional layer and each adjacent web is provided by the web, by weld points which produce an intermittent overall weld, and in that said weld points also guarantee the cohesion of the stack, as well as the method for manufacturing same.

20 Claims, 3 Drawing Sheets

(51) Int. Cl.
  *B32B 5/26* (2006.01)
  *B32B 7/04* (2006.01)
  *B32B 5/02* (2006.01)
  *B29B 11/16* (2006.01)
  *B29C 70/10* (2006.01)
  *B29C 70/22* (2006.01)
  *D04H 1/4242* (2012.01)
  *D04H 1/498* (2012.01)
  *D04H 1/559* (2012.01)
  *D04H 13/00* (2006.01)
  *B29K 101/12* (2006.01)
  *B29K 105/08* (2006.01)
  *B29K 707/04* (2006.01)

(52) U.S. Cl.
  CPC . *B32B 5/12* (2013.01); *B32B 5/26* (2013.01); *B32B 7/045* (2013.01); *D04H 1/4242* (2013.01); *D04H 1/498* (2013.01); *D04H 1/559* (2013.01); *D04H 13/00* (2013.01); *B29K 2101/12* (2013.01); *B29K 2105/0854* (2013.01); *B29K 2707/04* (2013.01); *B32B 2250/20* (2013.01); *B32B 2260/023* (2013.01); *B32B 2262/02* (2013.01); *B32B 2262/0261* (2013.01); *B32B 2262/106* (2013.01); *Y10T 428/24124* (2015.01)

(56) References Cited

U.S. PATENT DOCUMENTS

| | | | |
|---|---|---|---|
| 5,229,191 A * | 7/1993 | Austin | 428/198 |
| 5,241,842 A | 9/1993 | Hagel | |
| 6,276,174 B1 | 8/2001 | Wunner et al. | |
| 6,503,856 B1 | 1/2003 | Broadway et al. | |
| 6,585,842 B1 | 7/2003 | Bompard et al. | |
| 6,596,109 B2 * | 7/2003 | Posa et al. | 156/73.2 |
| 6,828,016 B2 | 12/2004 | Mitani et al. | |
| 6,995,099 B1 | 2/2006 | Nishimura et al. | |
| 7,323,072 B2 * | 1/2008 | Engelhart et al. | 156/73.2 |
| 2003/0008125 A1 | 1/2003 | Delanoy et al. | |
| 2003/0180514 A1 | 9/2003 | Baudonnel | |
| 2005/0016915 A1* | 1/2005 | Beck | 210/490 |
| 2009/0068428 A1* | 3/2009 | Shinoda et al. | 428/212 |

FOREIGN PATENT DOCUMENTS

| | | |
|---|---|---|
| JP | 2007182661 | 7/2007 |
| JP | 2008132650 | 6/2008 |
| WO | 2006-121961 | 11/2006 |
| WO | 2007-015706 | 2/2007 |
| WO | 2010-046609 | 4/2010 |

\* cited by examiner

MULTIAXIAL STACK RIGIDLY CONNECTED BY MEANS OF WELD POINTS APPLIED BY MEANS OF INSERTED THERMOPLASTIC WEBS

BACKGROUND OF THE INVENTION

1. Field of the Invention

The invention concerns the technical field of reinforcement materials adapted to the creation of composite parts. More specifically, the invention concerns a new multiaxial stack for fabricating composite parts, by subsequent injection or infusion of thermosetting resin, and its fabrication process.

2. Description of Related Art

The fabrication of composite parts or goods, that is, containing on one hand one or several reinforcements or fibrous layers, and on the other hand, a primarily thermosetting matrix ("resin") that may include thermoplastics, can for instance be achieved by a process called "direct" or "LCM" ("Liquid Composite Molding" in English). A direct process is defined by the fact that one or several fiber reinforcements are handled in a "dry" state (that is, without the final matrix), the resin or the matrix being handled separately, for instance by injection into the mold containing the fiber reinforcemnts ("RTM" process, "Resin Transfer Molding" in English), by infusion through the thickness of the fiber reinforcemnts ("LRI" process, "Liquid Resin Infusion" in English or "RFI" process, "Resin Film Infusion" in English), or else by manual coating/impregnation with a roller or brush on each of the unit layers of fibrous reinforcement, applied successively on the mold.

For the RTM, LRI or RFI processes, it is generally first necessary to build a fibrous preform of the mold of the desired finished product, then to impregnate this preform with a resin. The resin is injected or infused by a pressure differential at temperature, then once all the amount of necessary resin is contained in the preform, the assembly is brought to a higher temperature to complete the polymerization/reticulation cycle and thus activate its hardening.

In these sectors, a large number of preforms are fabricated from a reinforcement material, primarily carbon fibers, notably of the unidirectional type. The resin that is subsequently associated, notably by injection or infusion, with the unidirectional reinforcement layers during the creation of the part, can be a thermosetting resin, of an epoxy type for instance. In order to allow a correct flow through a preform composed of a stack of different layers of carbon fibers, this resin is most often very fluid. The major inconvenience of this type of resin is its fragility after polymerization/reticulation, which results in poor resistance to impact for the fabricated composite parts.

In order to solve this problem, the documents of previous art suggested that the unidirectional layers of the carbon fibers be associated with a web of thermoplastic fibers. Solutions such as these are notably described in the patent applications or patents EP 1125728, U.S. Pat. No. 628,016, WO 2007/015706, WO 2006/121961 and U.S. Pat. No. 6,503,856. The addition of this web makes it possible to improve mechanical properties in the compression after impact (CAI) test commonly used to characterize the impact resistance of the structures.

Furthermore, for the fabrication of composite parts, multiaxial stacks are very often used comprising unidirectional layers extending in different directions. Most often, these unidirectional layers are attached to each other by stitching or knitting.

Patent application EP 1473132 in turn, describes a stack of multiaxial unidirectional layers associated with webs, the connection between the unidirectional layers of this stack being achieved by means of heated rollers which provide a continuous weld.

Document EP 1348791 describes a combination of unidirectional carbon layers in which the strands are oriented parallel to each other, the connection between the layers being obtained by means of thermoplastic bonding filaments which are aligned and spaced apart from each other.

SUMMARY OF THE INVENTION

In this context, one of the objectives of the invention is to offer a new type of multiaxial stack, which makes it possible to lead to final composite parts that combine good mechanical properties with an absence of the microfissures observed in the case of stitched or knitted stacks.

Another objective of the invention is to provide a multiaxial stack that can be produced at an attractive cost.

Another objective of the invention is to provide a multiaxial stack with good drapability and manipulability.

In this context, the invention presents a new stack of fibrous materials comprising at least two layers of unidirectional carbon fibers, each extending in a different direction, wherein each of the unidirectional layers is attached on at least one of its surfaces to an adjacent web of thermoplastic fibers, and wherein at least one web is present between two consecutive unidirectional layers characterized in that the bond between each unidirectional layer and each web adjacent thereto is achieved by means of the web, with weld points creating a discontinuous overall weld, and characterized in that these weld points also assure the cohesion of the stack.

The invention also relates to a process for manufacturing a stack according to one of the preceding claims, characterized in that it comprises the following steps:

a) create a stack of fibrous materials comprising at least two layers of unidirectional carbon fibers, each extending in a different direction, in which a web of thermoplastic fibers is placed on at least one of the surfaces of each unidirectional layer, at least one web being present between two consecutive unidirectional layers;

b) produce weld points creating an overall discontinuous weld, by heating the webs so as to achieve a bond between each unidirectional layer and each web adjacent thereto and to also assure the cohesion of the stack.

According to a method for implementing the process, the unidirectional layers are created in-line without endowing them with any cohesion of their own before binding them to the web.

According to another method for implementing the process, which can be combined with the previous one, the transversal bond of all the layers and webs composing the stack is created simultaneously at each weld point.

According to another method for implementing the process, which can be combined with either or both of the previous methods, the weld points are obtained by thermocompression.

According to another method for implementing the process, which can be combined with either and/or any of the previous methods, the weld points are obtained by perforating the entire thickness of the stack, each weld point notably being performed around the perforations.

The following description, with reference to the appended figures, makes it possible to better understand the invention.

BRIEF DESCRIPTION OF THE DRAWINGS

FIGS. 8 and 9 show the mechanical data obtained for the stack of Example 1, compared to a corresponding stitched stack (comparative example).

DETAILED DESCRIPTION OF THE INVENTION

Figure 1:
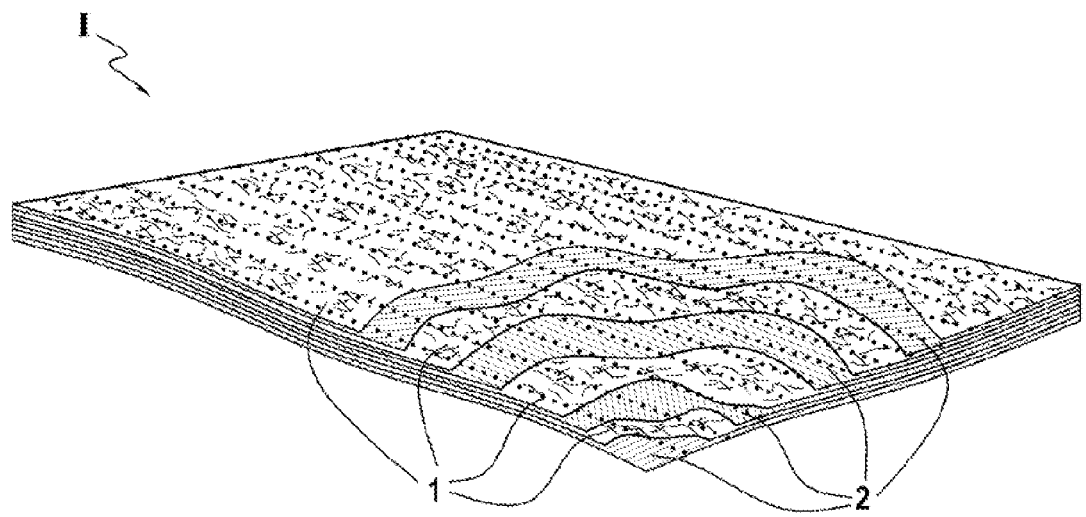
FIG. 1 is a partial cutaway view of a stack described in Example 1.

As part of the invention, the bond between the different unidirectional layers constituting the stack is assured by the thermoplastic nature of the webs. Hot welds are performed by means of the different webs: the inserted ones, called internal webs, located between two consecutive unidirectional layers, and the one or ones located on the periphery to form an outer face of the stack, called external webs. As part of the invention, we present a multiaxial stack rigidly connected by weld points obtained by means of the thermoplastic nature of the inserted webs and of the external web or webs. In particular, the bond between the different unidirectional layers (UD) and webs is assured neither by stitching, nor by knitting, which offers the advantages mentioned above.

Within the stack according to the invention, it is essential that at least one web be present between two consecutive unidirectional layers, so as to assure the cohesion of the whole. Advantageously, the stack according to the invention consists exclusively of unidirectional layers of carbon fibers and of thermoplastic fiber webs. It is possible to position two or even more webs between two consecutive unidirectional layers. But according to a preferred embodiment of the invention shown in FIG. 1, a single web 1 is located between two layers 2 of consecutive unidirectional carbon fibers within the stack I. According to a method for implementing the invention which corresponds to that of FIG. 1, the stack corresponds to a sequence (web/UD)$^n$, UD designating a unidirectional layer and n designating an integer, with all the webs present in the stack having the same grammage. According to a method for implementing the invention not shown, the stack corresponds to a sequence (web/UD)$^n$/web, UD designating a unidirectional layer and n designating an integer, the external webs having grammages equal to one-half the grammage of each of the internal webs. Both configurations make it possible to superimpose different stacks, while having the same grammage at each interply. In all cases, the integer n is a function of the number of plies present in the stack and will be, for example, in the range of 2 to 32.

As part of the invention, a "unidirectional layer of carbon fibers" means a layer composed exclusively or almost exclusively of carbon fibers laid parallel to each other. According to the process of the invention, the layers of unidirectional carbon fibers can be produced in-line. In this case, the strands needed to create the layer are unwound from spools and positioned so as to extend parallel to each other and joined together on a conveyor belt, possibly carrying a web, itself possibly superimposed with one or several sequences of web/unidirectional layer. Thus, according to an embodiment of the invention, each layer of unidirectional carbon fibers has no cohesion of its own before being bound to the thermoplastic fiber webs. In this case, the unidirectional layers are formed directly without intermediate cohesion and superimposed in different directions, inserting the necessary webs, notably a single web between two unidirectional layers. Conventional multiaxial production machines can be used. The documents U.S. Pat. No. 4,484,459, U.S. Pat. No. 4,677,831, U.S. Pat. No. 5,241,842 and U.S. Pat. No. 6,276,174 notably, which can be used as references, describe such machines for the creation of multiaxials. In document U.S. Pat. No. 4,484,459, for example, each unidirectional layer is formed by passing a strand around the pins mounted on two parallel endless chains, so that the portions of strands stretched freely between the pins are parallel to each other. Unidirectional layers are formed by guiding the respective strands in different directions and are bound together by stitching. The technique described in the document U.S. Pat. No. 4,677,831 consists of longitudinally moving a primary unidirectional layer parallel to the direction of its components, and to overlay it with transversal unidirectional layers whose directions form predetermined angles with the primary layer (0°), for instance +45° and −45° and/or +60° and −60°. The transversal layers are deposited by a lay-up process between two conveyor chains with pins located on each surface of the primary layer. Of course, whatever the technique used to deposit the unidirectional layers in different directions, the stitching or knitting methods conventionally used to assemble the stack will be replaced as part of the invention by welding methods capable of creating the desired bond.

It can also be specified for each layer of unidirectional carbon fibers to have a cohesion of its own before being bound to the thermoplastic fiber webs. This cohesion can, for example, be obtained by needlepunching, by the presence of thermoplastic bonding fibers crossing, without interlacing, the fibers of the unidirectional layer so as to assure adhesive bonding, or by the presence of the weft strands forming a unidirectional fabric. It is possible, for instance, to use a commercial unidirectional layer whose cohesion and manipulability will, for instance, be assured by bonding strands pursuant to a mechanical weaving bond, or pursuant to a chemical bond using the polymeric nature of the bonding strands. In all cases (manufacturing line or layer with its own cohesion), the unidirectional layer will preferably provide total coverage with an openness factor of 0% before being rigidly connected to the web(s). Such layers are, for example, marketed by SIGMATEX UK Limited, Runcom Cheshire WA7 1TE, United Kingdom under the references PW-BUD (for instance product No. PC2780600 200GSM/PW-BUD/T700SC 12K 50C/0600 mm), or by the OXEON AB company, Sweden, as item TEXERO.

It is therefore possible to stipulate the presence of thermoplastic bonding fibers, notably polyamides, copolyamides, polyesters, copolyesters, ester/ether block copolyamides, polyacetals, polyolefins, thermoplastic polyurethanes, phenoxies, to facilitate, if need be, the manipulation of the layer before its association with the thermoplastic fiber webs. These bonding strands will most often extend transversally to the carbon fibers. The term "unidirectional layer" also includes the unidirectional fabrics in which the spaced weft strands cross with interlacing, the carbon fibers that extend parallel to one another and constitute the warp strands of the unidirectional fabric. Even in these different cases, where such bonding, stitching or weft strands are present, the carbon fibers parallel to each other represent at least 95% of the layer by weight, which is therefore described as "unidirectional". However, according to a particular embodiment of the invention, the unidirectional layer contains no weft fiber to interlace with the carbon fibers, so as to avoid any crimping. In particular, the unidirectional layers used according to the invention are neither woven, nor stitched, nor knitted. In each unidirectional layer, the carbon strands are preferably not associated with a polymeric binder and are therefore qualified as dry, that is, they are neither impregnated, nor coated, nor associated with any binding polymer before their association with the thermoplastic webs. The carbon fibers are, however, most often characterized by a standard sizing weight ratio that can represent at most 2% of their weight.

A process for fabricating unidirectional layers, as described in patent EP 0972102, may also be implemented. This patent describes a process for producing a multiaxial fibrous layer comprising steps that consist of superimposing several unidirectional layers in different directions, and of binding the superimposed layers to each other, wherein, to produce at least one of the unidirectional layers, at least one strand is spread to obtain a layer of essentially uniform thickness with a width of at least 5 cm and a surface density not exceeding 300 g/m$^2$, with the unidirectional layer being provided with a cohesion that allows it to be manipulated prior to its superposition with at least one other unidirectional layer.

In a particular fabrication mode, each unidirectional layer of carbon fibers has a surface density of 100 to 280 g/m$^2$. This grammage range makes it easy for design engineers to correctly dimension composite structures by adapting the stacking sequences of different layers as a function of the different mechanical stress modes of the composite structures. A lower carbon grammage of an elementary layer will offer that much more versatility in the choice of different possible constant thickness stacks.

In each unidirectional layer, the carbon fibers are most often in the form of strands of at least 1000 filaments and notably 3000 to 50,000 filaments, for instance 3K, 6K, 12K or 24K. The carbon fibers have a count between 60 and 3800 tex, and preferably between 400 and 900 tex. The thickness of the carbon unidirectional layer varies between 90 and 270 μm.

"Web" signifies a non-woven material of continuous or short fibers. In particular, the fibers composing the non-woven material will have average diameters in the range of 0.5 et 70 μm. In the case of a short-fiber non-woven material for instance, the fibers will have a length of 1 to 100 mm.

According to the invention, the fibers constituting the web are advantageously composed of a thermoplastic material, notably chosen from among polyamides (PA: PA6, PA12, PA11, PA6,6, PA 6,10, PA 6,12, . . . ), copolyamides (CoPA), Polyamides-block ether or ester (PEBAX, PEBA), polyphthalamide (PPA), polyesters (polyethylene terephthalate -PET-, Polybutylene terephthalate -PBT- . . . ), copolyesters (CoPE), thermoplastic polyurethanes (TPU), polyacetals (POM . . . ), polyolefins (PP, HDPE, LDPE, LLDPE . . . ), polyether sulfones (PES), polysulfones (PSU . . . ), polyphenylene sulfones (PPSU . . . ), polyether ether ketones (PEEK), polyether ketone ketones (PEKK), poly (phenylene sulfide) (PPS), or polyetherimides (PEI), thermoplastic polyimides, liquid crystal polymers (LCP), phenoxys, block copolymers such as styrene-butadiene-methyl methacrylate copolymers (SBM), methylmethacrylate-butyl acrylate-methylmethacrylate copolymers (MAM) or a mixture of fibers composed of these thermoplastic materials.

The thickness of the webs before their association with the unidirectional layer is very close to their thickness within the consolidated stack. The thickness of the different webs before association can be determined by the standard NF EN ISO 9073-2 using method A with a test area of 2827 mm$^2$ (60 mm-diameter disc) and an applied pressure of 0.5 kPa. Within the stack, for instance, each web has a thickness of 0.5 to 50 microns, preferably 3 to 35 microns. This thickness notably contributes to a high volume fiber ratio when the stack is used to form a composite part, particularly of high thickness, by the vacuum infusion technique. Furthermore, as an example, each web has a surface density in the range 0.2 to 20 g/m$^2$. For reasons of simplicity it may be advantageous for all the webs present in the stack to be identical, except for the two external webs in the case of a stack (web/UD)$^n$/web, whose grammage will be equal to half the grammage of each internal web.

In the stack, at least two of the existing unidirectional layers will be positioned so as to be oriented in two different directions. The stack can be qualified as multiaxial. All the unidirectional layers or only some of them can have different directions, while the others can have identical directions. In case several layers have identical directions, they will not be two consecutive layers. Otherwise, the unidirectional layers will preferably have identical characteristics. The favored orientations are most often those at an angle of 0°, +45° or −45° (corresponding equally to +135°, and at +90° to the principal axis of the part to be created. The 0° orientation corresponds to the axis of the machine fabricating the stack, that is, the axis corresponding to the direction of travel of the stack during its fabrication. The principal axis of the part, which is generally the largest axis of the part, generally coincides with 0°. It is, for instance, possible to create stacks that are quasi-isotropic, symmetrical, or oriented by selecting the orientation of the plies. Examples of quasi-isotropic stacking include the stacking angles of 45°/0°/135°/90° or 90°/135°/0°/45°. Examples of symmetrical stacking include the stacking angles of 0°/90°/0°, or 45°/135°/45°. In particular, it is possible to consider assembling 2 to 32 plies, notably 16 to 24 plies. The numbers of plies most currently used are 8, 16, 24 and 32 plies, which could for instance be multiples of the 4-ply quasi-isotropic stacks mentioned above.

Figure 2:
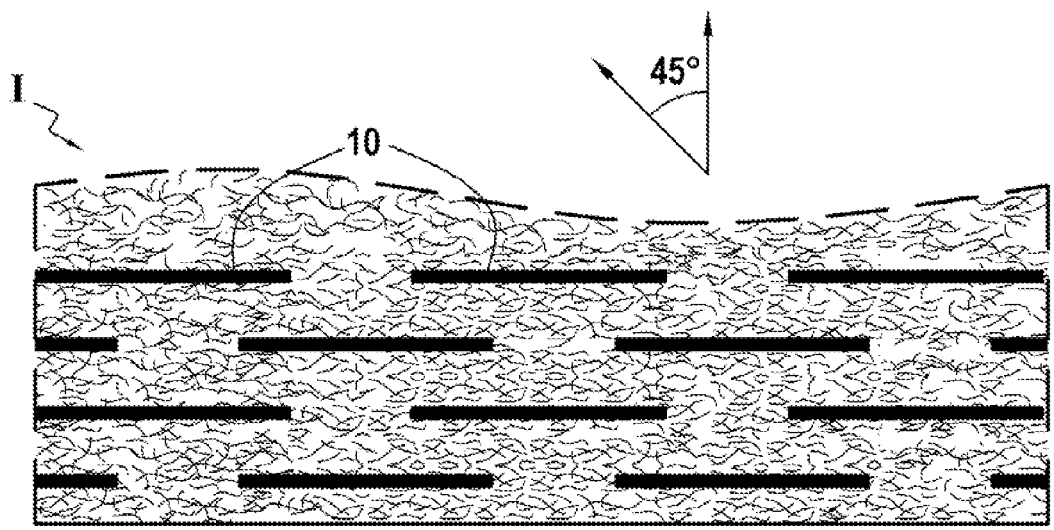
FIG. 2 is a top view of a stack described in the invention, wherein the weld points in the plane of the stack are discontinuous lines.
Figure 3:
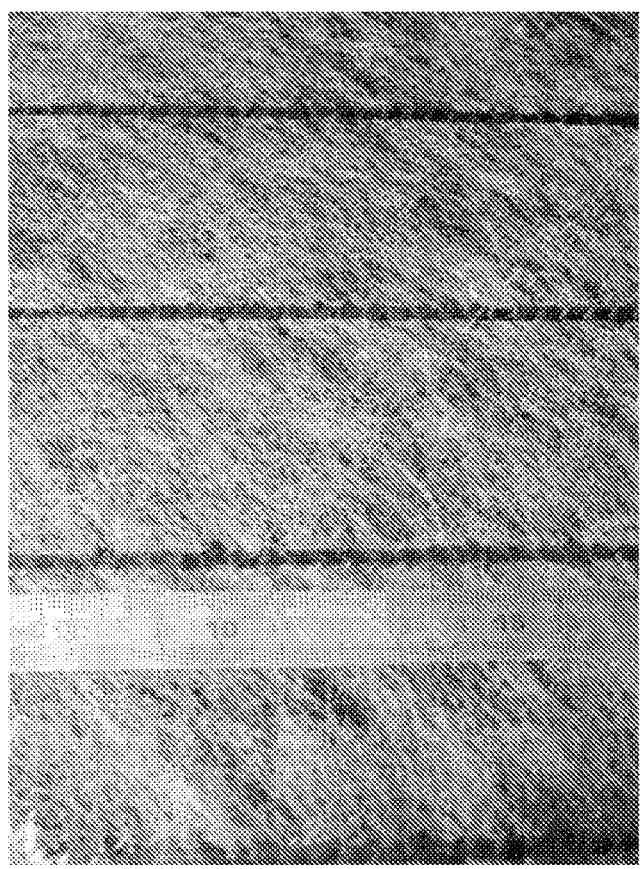
FIG. 3 is a photograph of the top of a stack described in the invention, wherein the weld points in the plane of the stack are continuous lines.
Figure 4A:
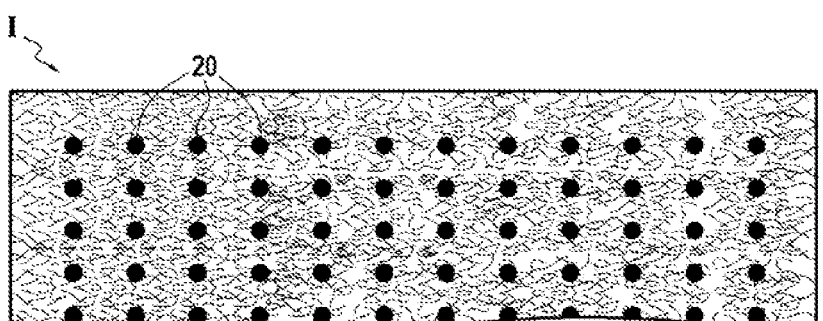
FIG. 4A is a top view of a stack described in the invention, wherein the weld points in the plane of the stack are points that appear in the form of discs.
Figure 4B:
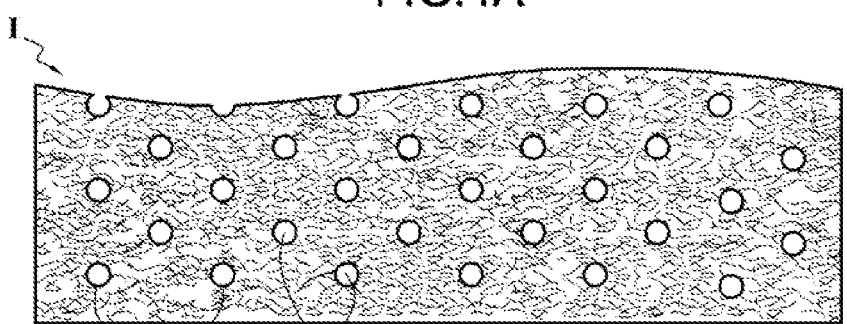
FIG. 4B is a top view of a stack described in the invention, wherein the weld points in the plane of the stack are points that appear in the form of rings.

According to the invention, the stack, that is, the set of webs and UD, is rigidly connected neither by stitching, nor by knitting, but by a weld produced by means of the thermoplastic nature of the webs present in the stack. To this end, a heating/cooling operation is performed on certain areas solely at the surface of the stack. This heating can be obtained conventionally by resistance heating or by ultrasonic methods. The heating causes the fusion or at least the softening of the different webs. Such a bond, using the thermoplastic nature of the webs is advantageous because it avoids all the disadvantages represented by the presence of stitching or knitting strands, notably problems such as crimping, microfissures, reduced mechanical properties of the composite parts subsequently obtained, etc. The implemented bond corresponds to a discontinuous weld, as opposed to a continuous weld obtained by thermocompression performed on the entire surface of the stack. According to the invention, for each unidirectional layer, the surface of all weld points represents, for example, 0.1 to 40%, preferably 0.5 to 15% of the surface of the unidirectional layer. A discontinuous weld has an advantage in terms of energy as well as for the drapability of the stack when fabricating subsequent composite parts. Weld points leading to an overall discontinuous weld are in place. The term "point" is used as part of the description to designate individual welds belonging to a set of welds and therefore includes different forms of welds. In the plane of the stack, that is, parallel to the various webs and unidirectional layers, weld points may notably appear in the form of discontinuous lines 10 as shown in FIG. 2, or continuous ones as shown in FIG. 3, that is, extending over the full width of the unidirectional layer as dots of various shapes, notably circular as shown in FIG. 4A labeled 20, or prismatic, rings as shown in FIG. 4B labeled 30, etc. These weld points are distributed over the surface of the stack to assure its cohesion and make it possible to assure a bond between the unidirectional layers and the webs throughout the thickness of the stack. Such a bond can notably be transversal. Adapted thermal or ultrasonic heating methods may be used, notably in the form of one or several heating rods in the case of bond lines or heated punches in the case of point bonds, whose geometry at the contact point with the stack will be adapted to the desired shape of the point bonds. Such heating methods may be brought to a temperature of 190 to 220° C. and pressed on the stack with a pressure of 10 to 50 kPa, for 0.1 to 2 s for example, preferably from 0.5 to 1 s. Of course, these values are purely illustrative and depend notably on the number of plies and the thermoplastic components of the webs. For example, weld points can be created regularly and are preferably located on straight lines extending in one or two directions, notably at intervals of 4 to 50 mm and a distance between two parallel lines in the range of 10 to 100 mm. The welds, from one parallel line to another, will be aligned as shown in FIG. 4A or offset, notably by a half-step as shown in FIG. 4B, which illustrates the case in which the welds are ring-shaped. Such weld points may, for example, have a larger dimension, measured parallel to the surface of the stack, in the range of 2 to 100 mm. The implementation of the weld points will be preferred in the cases wherein the unidirectional layers have a cohesion of their own before their association with the webs. In case the unidirectional layers adhere prior to their association with the webs, for each unidirectional layer, the surface of all the weld points represents for example, 0.1 to 30%, preferably 0.5 to 5% of the surface of the unidirectional layer.

Figure 5:
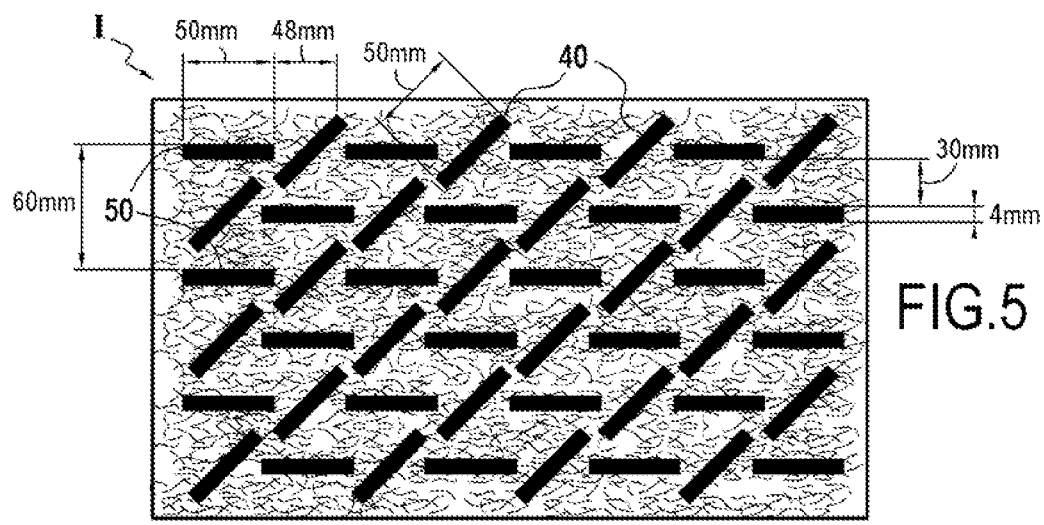
FIG. 5 is another top view of a stack described in the invention, wherein the weld points in the plane of the stack are discontinuous lines.

If the layers do not have a cohesion of their own before their association with the webs, for each unidirectional layer, the weld point sections represent a total area of to 1 to 40%, preferably 5 to 15% of the total area of the unidirectional layer. In this case, weld points in the form of lines are preferably used because they will more easily assure the bonding of all the strands of the unidirectional layers and lend the stack its cohesion and manipulability. In one embodiment, the weld points correspond to continuous weld lines parallel to each other. The continuous weld lines may, for example, be spaced by 10 to 50 mm from each other. In another embodiment, the weld points correspond to discontinuous weld lines. The discontinuous weld lines may, for example, have a length of 10 to 100 mm. The discontinuous weld lines may be distributed along parallel lines, being offset with respect to each other from one line to another, as shown in FIG. 2. It is also possible to produce lines of discontinuous welds 40 and 50 extending in different directions as shown in FIG. 5, wherein the distances between the perforations are purely illustrative, with different variations being possible, the latter being mentioned because they are used in Example 2. In this case, the presence of an offset within a single series is not always necessary. Within the same series of discontinuous weld lines extending along the same direction, the lines of discontinuous welds may, for example, be spaced from each other by 5 to 50 mm. Whatever the type of weld lines, continuous or discontinuous, they may for example have a width of 20 to 200 mm. All the dimensions indicated above refer of course to the plane of the stack, that is, to the plane of each of the unidirectional layers.

As mentioned previously, in order to assure the bonding of all the fibers of the unidirectional layers when they do not have a prior cohesion of their own, the welds may extend in continuous lines over the entire width of the intermediate material, as shown in FIG. 3. The direction of the lines will then be chosen so as to extend in a direction parallel with none of the orientations of the unidirectional layers. It is also possible to implement discontinuous lines as shown in FIGS. 2 and 5, each of which is a top view of a stack I according to the invention, on which discontinuous weld lines are produced, labeled 10 in FIGS. 2 and 40 and 50 in FIG. 5, such that each strand of each unidirectional layer present in the stack regularly encounters a weld, for example at least one weld every 100 mm, preferably at least one weld every 10 mm. It is possible to produce the welds 40 and 50 with separate heating bars or with a welding method such as a fluted bar making it possible to produce two welding lines 40 and 50 or even more in one welding operation. Here again, preferred are the orientations of discontinuous weld lines not parallel to all the orientations of the fibers of unidirectional layers, or even to only some of the orientations, when several series of discontinuous weld lines are present. Of course, these different welding methods using continuous or discontinuous lines can also be used when the unidirectional layers have a prior cohesion of their own, in which case, the orientation of the weld lines is less important and they can be spaced further apart.

Figures 6A, 6B:
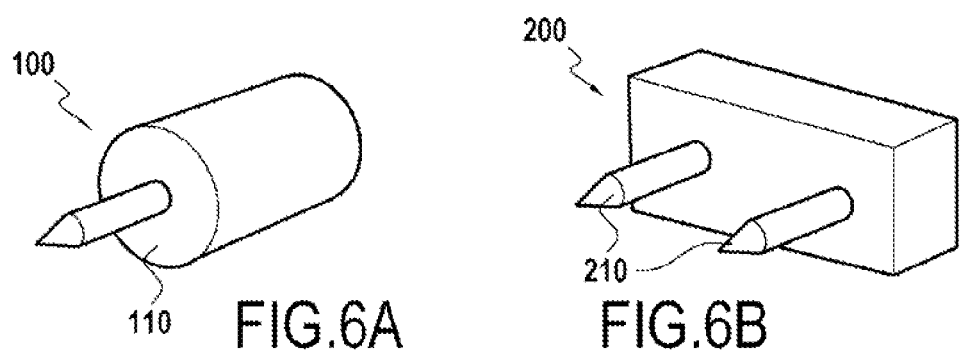
FIGS. 6A and 6B are each a perspective view of one example of a perforation method.

It is possible to produce the stack by adding each ply one by one, and assuring the bond after each addition of a ply. However, it is preferable to produce the bond in a single step, which presents definite industrial interest. To this end, although the heating methods described above are perfectly suitable, it also possible to use a heating method which will penetrate within the stack and penetrate entirely through it to produce direct heating on all the webs in the penetration area, and particularly on those located in the center of the stack. In this case, concomitantly with the bonding of plies with each other, perforations are produced in the stack to create diffusion channels for the resin, extending into the thickness of the stack, most often transversally to the plies of the stack. It is of course possible to perform a first bond of the stack as described above, and then to produce a perforation in order to increase the permeability of the fabricated stack, but for obvious reasons of cost, it is preferable to simultaneously produce the desired welds and perforations. In all cases, it may be worth achieving an openness factor of 0.05 to 3%, preferably between 0.1 and 0.6%, obtained with perforations through the thickness of the stack. Such openness factors make it possible to obtain interesting permeabilities comparable or superior to those obtained with conventionally stitched multiaxials. The perforations present on the stack, for example, are larger measured parallel to the surface of the plies, ranging from 1 to 10 mm. According to such embodiment variants, it is thus possible to achieve a transverse permeability for the stack, notably $10^{-11}$ m$^2$ to $10^{-14}$ m$^2$, preferably $10^{-12}$ m$^2$ to $10^{-13}$ m$^2$ for a VFR of 57 to 63% and notably for a VFR of 60%. The perforations can be produced with any suitable perforation device, typically for example, needle, pin or other. Heat is applied around the perforation device, so as to obtain the desired bond between the plies, which also makes it possible to harden the perforation. This produces a fusion of the web around the means of perforation, which after cooling leads to a kind of eyelet around the perforation. When the perforation device is removed, the cooling is instantaneous, thus allowing the obtained perforation to harden. Preferably, the heating method is directly integrated into the perforation device such that the perforation device is itself heated. It is advantageous for the perforation device 100 to have a shoulder 110 as shown in FIG. 6A on which the stack will come to rest during the perforation, thus allowing the plies to be tightened against each other during the bond. This shoulder itself is heated and heats the webs while pressing on the assembly to be welded over a larger area surrounding the perforation. In this case, the weld points can be similar to rings 30, as shown in FIG. 4B, which surround each perforation 31. The surface of the shoulder 110 in contact with the stack corresponds in fact to the resulting weld. FIG. 6B shows another means of heating/perforating 200 used in cases where the welds are in the form of discontinuous lines. In the example shown, a bar heater 200 that produces discontinuous weld lines is equipped with two needles 210 allowing it to make two holes per discontinuous line. The pressure exerted during the perforation is similar to that described for heating alone and can, for example, range from 20 to 40 kPa, and is notably exerted for a duration of 1.1 to 2 s, and notably for 0.5 to 1 s. This pressure is chosen so as to maintain an essentially constant thickness at all points of the stack.

Figure 7:
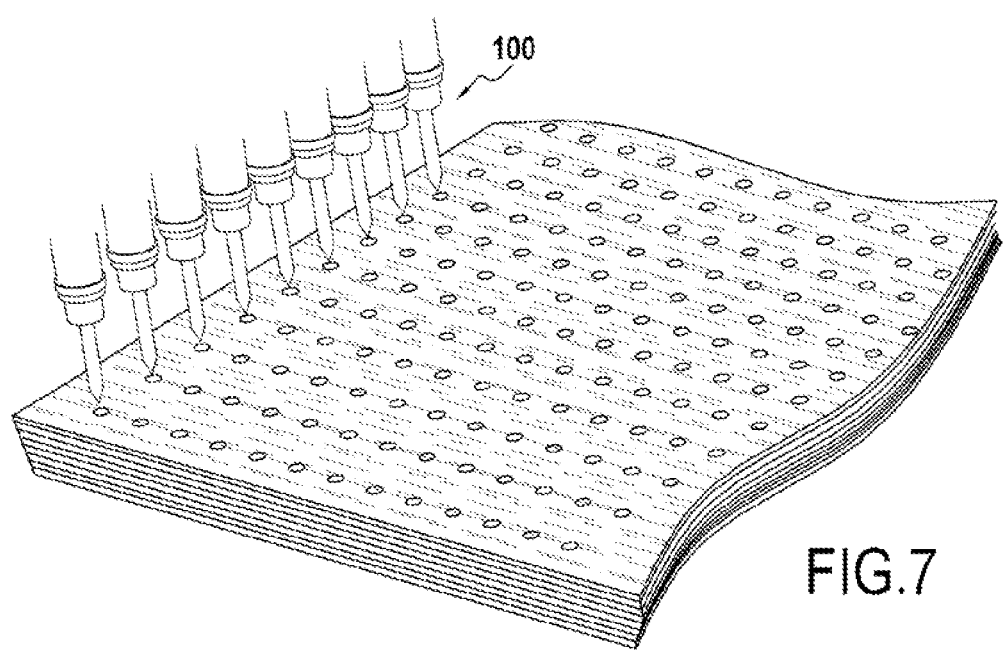
FIG. 7 is a partial view of a device incorporating a variety of methods for in-line perforation.

It is possible to perforate manually or preferably automatically by a perforation device aligned along the perforation lines and spacing steps, as shown in FIG. 7 for the perforation device 100 illustrated in FIG. 6A.

For the fabrication of composite parts, a thermosetting resin or matrix will be subsequently added to the stack, for example by injection into the mold containing it ("RTM" process, "Resin Transfer Molding" in English) or by infusion (through the thickness of the plies: "LRI" process, "Liquid Resin Infusion" in English or "RFI" process, "Resin Film Infusion" in English). The matrix used is most often thermosetting. The injected resin is for example selected among the following thermosetting polymers: epoxies, unsaturated polyesters, vinyl esters, phenolics, polyimides, bismaleimides.

The composite part is then obtained after a thermal treatment. In particular, the composite part is generally obtained through a conventional hardening cycle of the polymers being used, by performing a thermal treatment recommended by the suppliers of said polymers and known to the person skilled in the art. This hardening stage of the desired part is achieved by polymerization/reticulation according to a defined cycle of temperature and pressure, followed by cooling. The pressure applied during the treatment cycle is low in the case of infusion under vacuum, and higher in the case of injection into an RTM mold. According to an advantageous feature of the invention, the composite parts obtained have a fiber volume ratio of 57 to 63%, preferably 59 to 61%, even when they have a substantial thickness, notably greater than 10 mm and/or when fabricated by a method for injection under a pressure lower than atmospheric pressure, notably less than 1 bar and preferably between 0.1 and 1 bar. These volume fiber ratios are compatible with the use of structures for primary parts, that is, critical parts in aviation that withstand mechanical stress (fuselage, wings . . . ).

The volume fiber ratio (VFR) of a composite part is calculated from a measurement of the thickness of a composite part, knowing the surface density of the unidirectional carbon layer and the properties of the carbon fiber, using the following equation:

$$TVF(\%) = \frac{n_{plis} \times \text{Masse surfacique } UD_{carbone}}{\rho_{fibre\ carbone} \times e_{plaque}} \times 10^{-1} \quad (1)$$

Where $e_{plaque}$ is the thickness of the plate in mm,
$\rho_{fibre\ carbone}$ is the density of the carbon fiber in g/cm$^3$,
the surface density $UD_{carbone}$ is in g/m$^2$.

The composite parts obtained also have optimum mechanical properties, notably impact resistance (CAI, Compression After Impact), the mechanical properties showing the sensitivity to holes such as open hole compression (OHC, Open Hole Compression in English), open hole traction (OHT, Open Hole Traction in English), bearing (Bearing in English), in-plane shear (IPS, In-Plane Shear in English). In particular, it is possible to obtain composite parts having a stress rupture in compression after impact (CAI), measured according to the preliminary European standard prEN 6038 published by ASD-STAN (AeroSpace and Defence Standard, Avenue de Tervuren 270, 1150 Woluwe-Saint-Pierre, Belgium), greater than 200 MPa under an impact of 25 J. Also noted, especially when the resin matrix is of epoxy, was a small decrease of the epoxy Tg after aging, of the same order of magnitude as that obtained for standard pre-impregnates, known to the person skilled in the art.

The following examples make it possible to illustrate the invention, but are not limiting in nature.

As part of the invention, the transversal permeability values are obtained with the measurement device and method described in the thesis entitled "Problems of measuring the permeability of transversal fiber preforms for the fabrication of composite structures," [Problématique de la mesure de la perméabilité transverse de préformes fibreuses pour la fabrication de structures composites] by Romain Nunez, defended at the École Nationale Supérieure des Mines de Saint Etienne, 16 Oct. 2009. The change in VFR is obtained by successive variations of the sample thickness. The fluid used is water and the pressure is 1 bar +/−0.01 bar.

The openness factors can be measured using the following method. The device consists of a SONY camera (model SSC-DC58AP), equipped with a 10× objective, and a Waldmann light table, model W LP3 NR, 101381 230V 50 HZ 2×15 W. The sample to be measured is placed on the light table [sic], the camera is mounted on a frame and positioned at 29 cm from the sample and the focus is adjusted.

The width measurement is determined as a function of the fibrous material to be analyzed, using the (zoom) ring and a ruler: 10 cm for open fibrous materials (OF>2%), 1.17 cm for less open fibrous materials (OF<2%).

Using the diaphragm and a control negative, the brightness is adjusted to obtain an OF value corresponding to the one of the control negative.

The contrast measurement software Videomet, Scion Image (Scion Corporation, USA), is then used. After recording, the image is treated as follows: Using a tool, a maximum area is defined corresponding to the selected calibration, for instance for 10 cm-70 holes, and comprising an integer number of patterns. An elementary area, in the textile meaning of the term, that is, an area that describes the geometry of the fibrous material by repetition is then selected.

With the light from the light table passing through the openings of the fibrous material, the OF percentage is defined by one hundred from which is subtracted the black area divided by the elementary area, that is, 100−(black area/elementary area).

It should be noted that the brightness control is important because diffusion phenomena can alter the apparent size of the holes and therefore of the OF. An intermediate brightness will be selected, so that no excessive saturation or diffusion phenomenon is visible.

Example 1

Line-Welded Quasi-Isotropic Multiaxial

The following stack is created in-line on a multiaxial manufacturing machine: a unidirectional layer of carbon fibers oriented at 45°, a web, a unidirectional layer of carbon fibers oriented at 135°, a web.

The unidirectional layers of carbon fibers are fabricated in-line and their carbon fiber grammage is estimated at 268 g/m²±3%, using Hexcel HR fibers whose properties are given in Table 1.

TABLE 1

| Characteristic properties of carbon fibers | |
|---|---|
| | Hexcel HR |
| Stress rupture (MPa) | 4830 |
| Tensile modulus (GPa) | 241 |
| Elongation (%) | 1.8 |
| Weight/unit length (g/m) | 0.785 |
| Volume density (g/cm³) | 1.79 |
| Filament diameter (μm) | 8 |

Webs of short fibers based on polyamides are used.

The characteristics of the webs used are given in Table 2. The melting point indicated in Table 2 is determined by differential scanning calorimetry (DSC) according to the ISO 11357-3 standard. The surface density is measured according to the ISO 3801 standard. The porosity factor shown in Table 2 is calculated with the following formula:

$$\text{Taux de porosité}_{voile}\ (\%) = 1 - \frac{\text{Masse surfacique du voile}}{\rho_{matière\ du\ voile} \times e_{voile}} \times 100 \quad (2)$$

Where − the surface density of the web is expressed in kg/m², $\rho_{matière\ du\ voile}$ is expressed in kg/m³, $e_{voile}$ is expressed in m.

TABLE 2

Characteristics of the webs used (the values indicated after ± represent the standard deviation)

| Web characteristics | |
|---|---|
| Melting point of the web (° C.) | 178 |
| Surface density (g/m²) | 3.7 + 0.1 |
| Filament diameter (μm)* | 13 ± 3 |
| Web thickness (μm) | 69 ± 12 |
| Porosity percentage (%) calculated with formula (2) | 97 |

*Measured by image analysis

Weld lines separated by 50 mm are produced in a 90° orientation to the axis of the machine. The weld is produced by a V-shaped heating bar with a radius of curvature of 4 mm at the support. The bar is heated to 200° C. and a pressure of 30 kPa is applied for 0.8 s.

This bar is operated so that the contact surface compresses the plies evenly, to form weld lines as shown in FIG. 3.

The mechanical performances of the stack according to the invention are compared with those obtained with an identical stack which differs only in its bonding method: the welds have been replaced by chain stitches 5*5 mmm produced with a 76 dTex (polyamide) strand. The results are shown in Tables 3 and 4 below and in FIGS. 8 and 9.

TABLE 3

Comparative Stitched Example
Comparative Example

| Properties | Test Method | Draping | Impact Energy (J) | Average | Standard Deviation |
|---|---|---|---|---|---|
| Open hole compression - Stress [MPa] - pr EN 6036 type 1 + dim. 132 × 32 mm² + perforation 6.35 mm | pr EN 6036 type 1 sample dimensions: 132 × 32 mm² + perf. diam: 6.35 mm | [(45/135)/(0/90)]₂ₛ | | 331 | 14 |
| Compression after impact - Stress - Standardized at 60% VFR [MPa] | pr EN 6033 with energy range 10 to 50 J | [(45/135)/(0/90)]₂ₛ | 10 | 333 | |
| | | | 20 | 299 | 9 |
| | | | 25 | 261 | |
| | | | 30 | 246 | 5 |
| | | | 38 | 237 | 13 |
| | | | 40 | 246 | |
| | | | 50 | 243 | |

TABLE 3-continued

Comparative Stitched Example
Comparative Example

| Properties | Test Method | Draping | Impact Energy (J) | Average | Standard Deviation |
|---|---|---|---|---|---|
| Indentation depth (mm) | pr EN 6033 with energy range 10 to 50 J | [(45/135)/(0/90)]$_{2s}$ | 10 | 0.160 | |
| | | | 20 | 0.297 | 0.011 |
| | | | 25 | 0.580 | |
| | | | 30 | 0.762 | 0.058 |
| | | | 38 | 0.970 | 0.078 |
| | | | 40 | 1.288 | |
| | | | 50 | 1.313 | |
| Delaminated area [cm$^2$] | pr EN 6033 with energy range 10 to 50 J | [(45/135)/(0/90)]$_{2s}$ | 10 | 1.46 | |
| | | | 20 | 3.05 | 0.33 |
| | | | 25 | 4.12 | |
| | | | 30 | 6.82 | 1.00 |
| | | | 38 | 6.52 | 0.66 |
| | | | 40 | 7.91 | |
| | | | 50 | 10.73 | |

TABLE 4

Example 1
Example 1

| Properties | Test Method | Draping | Impact Energy (J) | Average | Standard Deviation |
|---|---|---|---|---|---|
| Open hole compression - Stress [MPa] - pr EN 6036 type 1 + dim. 132 × 32 mm$^2$ + perforation 6.35 mm | pr EN 6036 type 1 - sample dimensions: 132 × 32 mm$^2$ + perf. diam: 6.35 mm | [(45/135)/(0/90)]$_{2s}$ | | 305 | 10 |
| Compression after impact - Stress - Standardized at 60% VFR [MPa] | pr EN 6033 with energy range 10 to 50 J | [(45/135)/(0/90)]$_{2s}$ | 10 | 341 | |
| | | | 15 | 280 | |
| | | | 20 | 258 | |
| | | | 25 | 260 | |
| | | | 30 | 299 | 10 |
| | | | 38.8 | 257 | 10 |
| | | | 40 | 245 | |
| | | | 50 | 212 | |
| Indentation depth (mm) | pr EN 6033 with energy range 10 to 50 J | [(45/135)/(0/90)]$_{2s}$ | 10 | 0.178 | |
| | | | 15 | 0.194 | |
| | | | 20 | 0.321 | |
| | | | 25 | 0.606 | |
| | | | 30 | 0.836 | 0.051 |
| | | | 38.8 | 1.051 | 0.051 |
| | | | 40 | 1.178 | |
| | | | 50 | 1.503 | |
| Delaminated area [cm$^2$] | pr EN 6033 with energy range 10 to 50 J | [(45/135)/(0/90)]$_{2s}$ | 10 | 0.47 | |
| | | | 15 | 1.70 | |
| | | | 20 | 2.21 | |
| | | | 25 | 2.75 | |
| | | | 30 | 4.71 | 1.30 |
| | | | 38.8 | 5.87 | 0.91 |
| | | | 40 | 8.85 | |
| | | | 50 | 11.22 | |

Example 2

Point-Welded Perforated Quasi-Isotropic Multiaxial (4 Plies)

The stack shown in FIG. 1 is fabricated in-line on a multiaxial production machine: a unidirectional layer of carbon fibers oriented at 45°, a web, a unidirectional layer of carbon fibers oriented at 0°, a web, a unidirectional layer of carbon fibers oriented at 135°, a web, a unidirectional layer of carbon fibers oriented at 90° and a web.

The unidirectional layers of carbon fibers are created in-line with a carbon fiber grammage estimated at 194 g/m$^2$±3%, using Hexcel IM fibers whose properties are given in Table 5.

TABLE 5

Characteristic properties of carbon fibers

|  | Hexcel IM |
| --- | --- |
| Stress rupture (MPa) | 5610 |
| Tensile modulus (GPa) | 297 |
| Elongation (%) | 1.9 |
| Weight/unit length (g/m) | 0.443 |
| Volume density (g/cm3) | 1.80 |
| Filament diameter (μm) | 5 |

The webs are identical to those used in Example 1.

Two sets of discontinuous weld lines are produced, one in a 90° orientation and another in the 135° orientation from the axis of the machine, so as to alternate each weld line oriented at 90° with a weld line oriented at 135°, as shown in FIG. 5. To this end, a fluted heating bar is used, capable of performing the sets of welds 40 and 50 in one operation. It should be noted that a slight overlap is created between the discontinuous lines 50 of a same line and between two successive lines 40 to assure the bonding of all the strands deposited in the four orientations mentioned above.

This welding can be ideally combined with perforation by using the heating/perforation method shown in FIG. 6B.

All these examples produce stacks that are easily manipulated.

The invention claimed is:

1. A cohesive stack of layers of dry unidirectional carbon fibers that are not held together by stitching or knitting wherein said cohesive stack includes diffusion channels for infusing a thermosetting resin into said cohesive stack to form a composite part, said cohesive stack comprising:
a first layer having a first surface and a second surface, said first layer comprising a plurality of unidirectional carbon fibers extending in a first direction, wherein said first layer is not impregnated with a polymeric binder nor is said first surface or second surface of said first layer coated with a polymeric binder;
a second layer having a first surface and a second surface, said second layer comprising a plurality of unidirectional carbon fibers extending in a second direction, said second direction being different from said first direction, wherein said second layer is not impregnated with a polymeric binder nor is said first surface or second surface of said second layer coated with a polymeric binder;
a first internal web comprising a plurality of thermoplastic fibers and having a first surface and a second surface, said first surface of said first internal web being located adjacent to the second surface of said first layer and said second surface of said first internal web being located adjacent to the first surface of said second layer;
a first external web comprising a plurality of thermoplastic fibers and having a first surface and a second surface, said second surface of said first external web being located adjacent to the first surface of said first layer;
a first set of linear weld points that provide welding together of said first internal web, first external web, first layer and second layer, said first set of linear weld points comprising a plurality of first weld lines that are aligned collinearly in a first weld line direction and which each have a width, a head and a tail wherein the length of each of said first weld lines between said head and said tail is from 10 millimeters to 100 millimeters and wherein the head of each first weld line is spaced a distance from the tail of the adjacent first weld line to form openings between said first weld lines, said openings each having a length;
a second set of weld points located in the openings between said first weld lines, said second set of weld points providing welding together of said first internal web, first external web, first layer and second layer, said second set of weld points comprising a plurality of second weld lines that each have a width, a head and a tail wherein the length of each of said second weld lines between said head and said tail is from 10 millimeters to 100 millimeters, said second weld lines not being aligned collinearly wherein each second weld line extends in a direction that is different from said first weld line direction and wherein the length of said openings between said first weld lines and the length of said second weld lines are such that the head of each second weld line overlaps the tail of the first weld line adjacent thereto and the tail of each second weld line overlaps the head of the first weld line adjacent thereto;
a plurality of first weld point perforations which are located within said first weld points and which form diffusion channels for said thermosetting resin wherein each first weld point perforation extends transversally through said first and second layers and said first external web and said first internal web; and
a plurality of second weld point perforations which are located within said second weld points and which form diffusion channels for said thermosetting resin wherein each second weld point perforation extends transversally through said first and second layers and said first external web and said first internal web and wherein there is a sufficient number of first and second weld points to provide said cohesive stack of layers of dry unidirectional carbon fibers that are not held together by stitching or knitting.

2. A cohesive stack according to claim 1 which further comprises:
a third layer having a first surface and a second surface, said third layer comprising a plurality of unidirectional carbon fibers extending in a third direction, said third direction being different from said first direction and said second direction, wherein said third layer is not impregnated with a polymeric binder nor is said first surface or second surface of said third layer coated with a polymeric binder;
a fourth layer having a first surface and a second surface, said fourth layer comprising a plurality of unidirectional carbon fibers extending in a fourth direction, said fourth direction being different from said first direction, said second direction and said third direction, wherein said fourth layer is not impregnated with a polymeric binder nor is said first surface or second surface of said fourth layer coated with a polymeric binder;
a second internal web comprising a plurality of thermoplastic fibers and having a first surface and a second surface, said first surface of said second internal web being located adjacent to the second surface of said second layer and said second surface of said second internal web being located adjacent to the first surface of said third layer; and
a third internal web comprising a plurality of thermoplastic fibers and having a first surface and a second surface, said first surface of said third internal web being located adjacent to the second surface of said third layer and said second surface of said third internal web being located adjacent to the first surface of said fourth layer wherein said first and second sets of weld points provide welding together of said first internal web, said second internal web, said third internal web, said first external web, said first layer, said second layer, said third layer and said fourth layer and wherein said plurality of first and second weld point perforations extend transversally through said first layer, said second layer, said third layer, said fourth layer, said first external web, said first internal web, said second internal web and said third internal web.

3. A cohesive stack according to claim 2 wherein the grammage of said first internal web, said second internal web and said third internal web is substantially the same.

4. A cohesive stack according to claim 3 which further comprises a second external web comprising a plurality of thermoplastic fibers and having a first surface and a second surface, said second surface of said second external web being located adjacent to the second surface of said fourth layer, wherein said first and second sets of weld points provide welding together of said first internal web, said second internal web, said third internal web, said first external web, said second external web, said first layer, said second layer, said third layer and said fourth layer and wherein said plurality of first and second weld point perforations extend transversally through said first layer, said second layer, said third layer, said fourth layer, said first external web, said second external web, said first internal web, said second internal web and said third internal web and wherein the grammage of said first external web and said second external web is equal to one-half of the grammage of said first, second and third internal webs.

5. A cohesive stack according to claim 1 wherein said first and second layers each has a surface density of 100 to 280 g/m².

6. A cohesive stack according to claim 1 wherein said cohesive stack has an openness factor due to said first weld point perforations and said second weld point perforations in the range of 0.05 to 3%.

7. A cohesive stack according claim 1 wherein said first internal web has a surface density in the range of 0.2 to 20 g/m².

8. A cohesive stack according to claim 1 wherein said first internal web has a thickness of 0.5 to 50 microns.

9. A stack of fibrous materials which comprises a cohesive stack according to claim 1 and a thermosetting resin which has been infused into said cohesive stack through said diffusion channels.

10. A stack of fibrous materials which comprises a cohesive stack according to claim 2 and a thermosetting resin which has been infused into said cohesive stack through said diffusion channels.

11. A cohesive stack according to claim 2 wherein said first, second, third and fourth layers each has a surface density of 100 to 280 g/m².

12. A cohesive stack according to claim 2 wherein said cohesive stack has an openness factor due to said first weld point perforations and said second weld point perforations in the range of 0.05 to 3%.

13. A cohesive stack according claim 2 wherein said first, second and third internal webs each has a surface density in the range of 0.2 to 20 g/m².

14. A cohesive stack according to claim 2 wherein said first, second and third webs each has a thickness of 0.5 to 50 microns.

15. A cohesive stack according to claim 1 wherein at least two of said first weld point perforations are located within each of said first weld lines and wherein at least two of said second weld point perforations are located within each of said second weld point lines.

16. A cohesive stack according to claim 1 wherein the length of said openings between said first weld lines is from 5 millimeters to 50 millimeters.

17. A cohesive stack according to claim 1 wherein said cohesive stack has a principal axis and wherein said first direction of the unidirectional carbon fibers in said first layer is 45° or 90° with respect to said principal axis, said second direction of the unidirectional carbon fibers in said second layer is 0° or 135° with respect to said principal axis, said first weld line direction is 90° with respect to said principal axis and said second weld line direction is 45° or 135° with respect to said principal axis.

18. A cohesive stack according to claim 2 wherein said cohesive stack has a principal axis and wherein said first direction of the unidirectional carbon fibers in said first layer is 45° with respect to said principal axis, said second direction of the unidirectional carbon fibers in said second layer is 0° with respect to said principal axis, said third direction of the unidirectional carbon fibers in said third layer is 135° with respect to said principal axis, said fourth direction of the unidirectional carbon fibers in said fourth layer is 90° with respect to said principal axis, said first weld line direction is 90° with respect to said principal axis and said second weld line direction is 135° with respect to said principal axis.

19. A cohesive stack according to claim 1 which comprises a first row comprising said first and second weld points, a second row comprising said first and second weld points and a third row comprising said first and second weld points, said second row being located between said first and third rows, wherein the first and second weld points of said first and second rows are aligned with each other and wherein the first weld points of said second row are aligned with the second weld points of said first and third rows and the second weld points of said second row are aligned with the first weld points of said first and third rows.

20. A cohesive stack according to claim 19 wherein the length of each of said first and second weld lines is 50 millimeters and wherein the first weld lines in said first row are spaced 60 millimeters from the first weld lines in said third row.

* * * * *